Jan. 13, 1942.  T. J. MORGAN  2,269,952
FILM-CONTROLLED CIRCUIT SWITCH FOR MOTION PICTURE PROJECTORS
Filed April 7, 1941  2 Sheets-Sheet 1
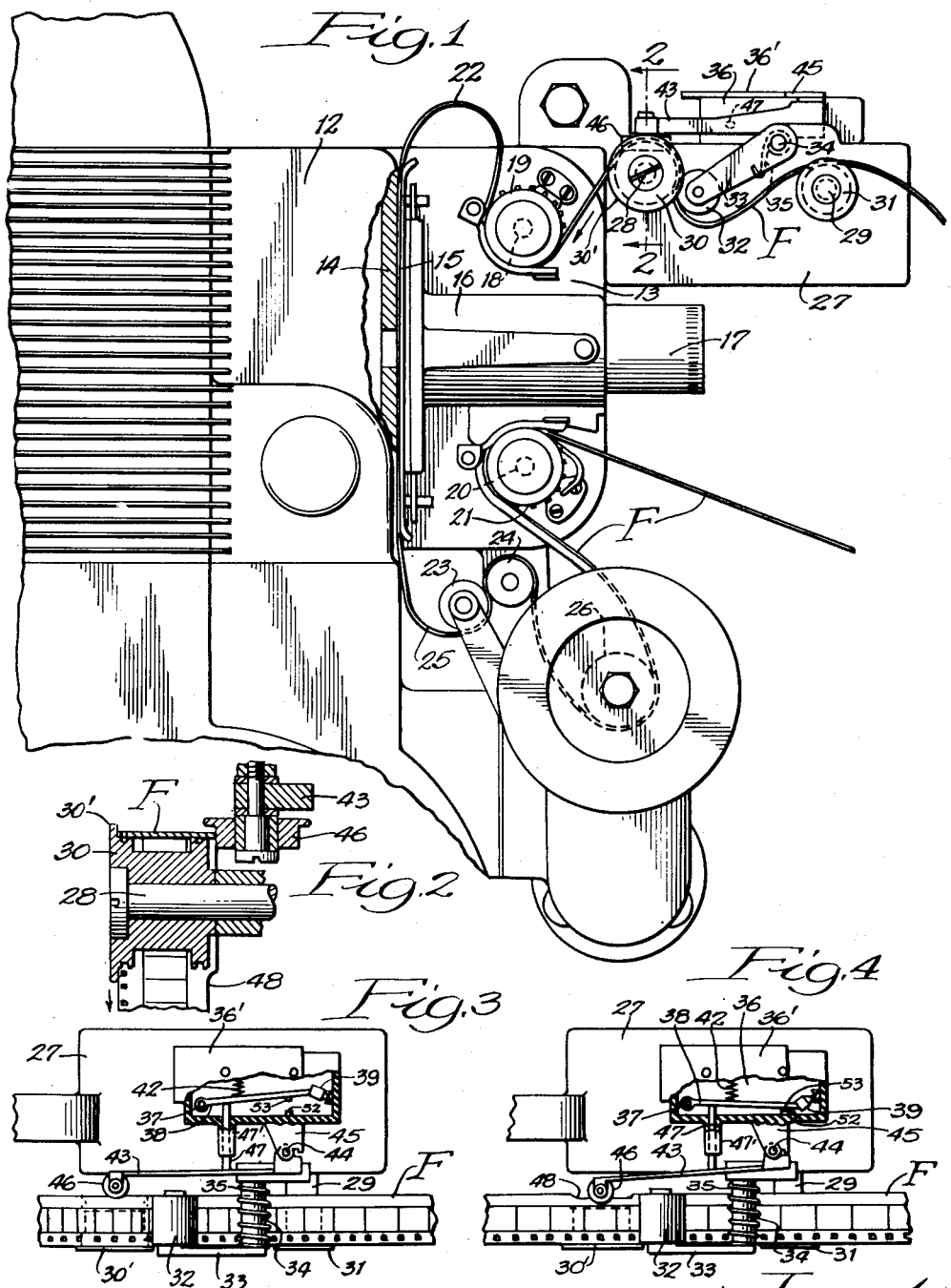

Jan. 13, 1942.  T. J. MORGAN  2,269,952
FILM-CONTROLLED CIRCUIT SWITCH FOR MOTION PICTURE PROJECTORS
Filed April 7, 1941  2 Sheets-Sheet 2
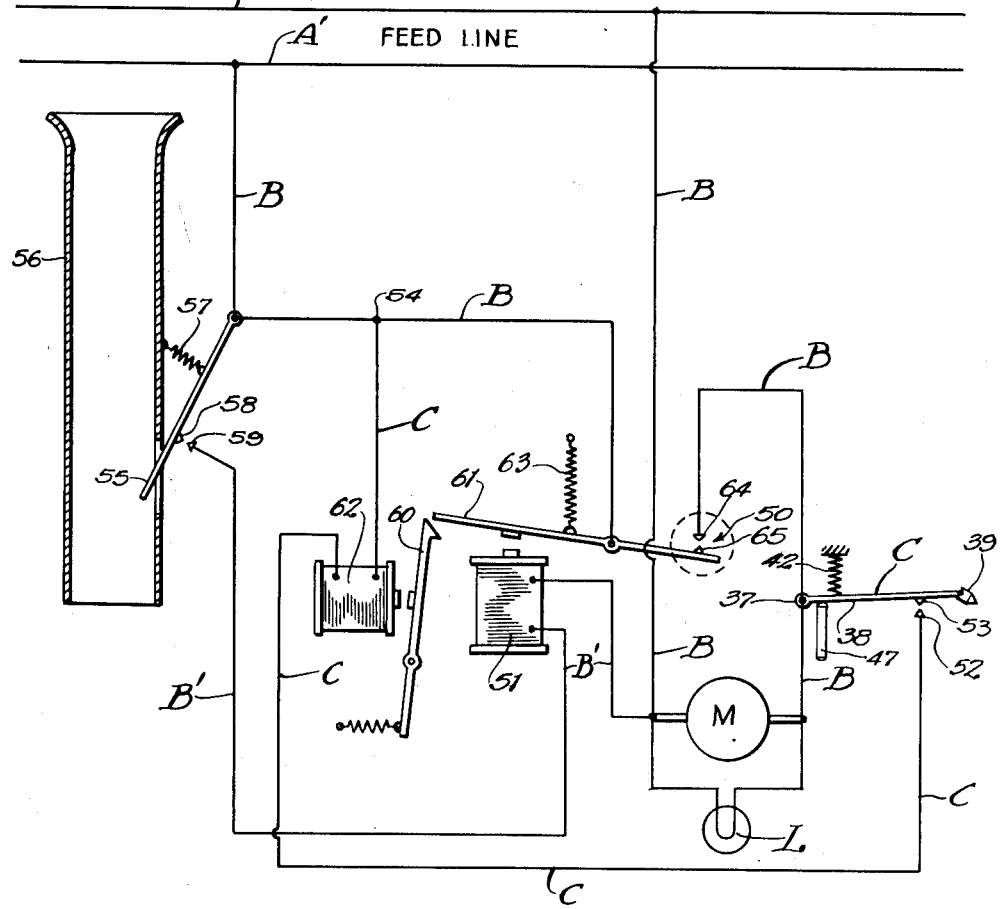
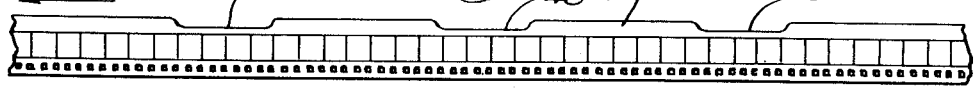
Inventor:
Thomas J. Morgan,
By Soans, Pond & Anderson
Attorneys.

Patented Jan. 13, 1942

2,269,952

UNITED STATES PATENT OFFICE 2,269,952

FILM-CONTROLLED CIRCUIT SWITCH FOR MOTION PICTURE PROJECTORS

Thomas J. Morgan, Chicago, Ill., assignor to Ampro Corporation, a corporation of Illinois Application April 7, 1941, Serial No. 387,128

3 Claims. (Cl. 88—17)

This invention relates to the art of motion picture projectors, and has reference more particularly to film-controlled circuit switches for such machines through the operation of which, when a picture record of the film has been fully shown and has reached its end, the electric circuit of the film feeding mechanism is interrupted. The invention is more especially, although not exclusively, designed for, and useful in, projectors of the endless film type, especially those wherein the operation of the machine is coin controlled, in order to insure but one showing of a complete picture record for a single deposited coin. Manifestly, if some automatic device for arresting the operation of the machine at the end of the film record were not employed, a customer might, for a single coin, obtain any desired number of repetitions. Some long films that are not of the endless type carry two or more complete picture records. In the case of such films the present invention may also be usefully employed to arrest the operation of the film movement at the end of each picture record.

To attain the result sought by the invention the latter preferably employs a main switch in the main film feed circuit, a spring urging said main switch to open position, a magnet for closing said main switch, a latch for holding said main switch closed, a relay circuit and magnet for retracting said latch, a normally open micro-switch in said relay circuit, a spring tending to close said normally open micro-switch, a lever carrying a roller engaged with one edge of the film and working against said last named spring to maintain said micro-switch open, and a notch or depression in that edge of the film engaged by the roller; the dropping of the roller into said notch allowing the last named spring to snap the micro-switch to closed position, and thus break the film feeding circuit by opening the main switch in the latter. This notch or depression is so located on the film that it will be engaged by the roller after the last frame of one picture record has crossed the light beam, and before the first frame of the next following picture record crosses the light beam. The projector lamp is preferably located in a lamp circuit in parallel with the main film feed circuit, so that when the film feed is arrested the lamp is extinguished, and when the film feed is again started the lamp re-lighted.

The purpose or object of the invention is to provide a very simple, reliable and efficient automatic device of the character above indicated for arresting the operation of the film feeding mechanism each time a complete picture record on a film has been shown.

An embodiment of the invention, which in practice has been found to satisfactorily effectuate the above stated purpose or object, is shown in the accompanying drawings, in which—

Fig. 1 is a side elevation, partly broken away and in section, of the gate portion of a motion picture projector, showing my improvements applied thereto and in idle or non-operating position.

Fig. 2 is an enlarged vertical cross-section taken on the line 2—2 of Fig. 1.

Fig. 3 is a top plan view, showing the film-operated micro-switch open and the switch operating parts in the positions they assume when the said switch is open.

Fig. 4 is a top plan view similar to Fig. 3, but showing the film-operated micro-switch closed and the switch operating parts in the positions they assume when the said switch is closed.

Fig. 5 is a diagram of a coin-controlled circuit that may be used on coin-controlled projectors, and, with slight modification, on projectors that are not started by a deposited coin.

Fig. 6 is a plan of a film having a plurality of notches.

The machine to which my present improvement is applied is, or may be, substantially identical with that disclosed in patent to Shapiro, No. 2,099,376, granted November 16, 1937, to which reference may be had for a full disclosure. Briefly describing the principal film feeding and guiding parts, 12 designates a housing containing the lamp (not shown) and 13 designates a gear box attached to and projecting forwardly of the housing 12. The front wall 14 of the housing and a vertical plate 15, mounted on the inner end of a casing 16 attached to the gear box 13 and supporting the objective tube 17, form between them a gate through which the film F is caused to travel by a rapid step-by-step movement, as is well known in the art. Journaled in the gear box 13 is the shaft 18 of the upper film feed sprocket 19, and also journaled in the gear box 13 is a shaft 20 of the lower film feed sprocket 21. As is usual, an upper loop 22 is maintained in the film between the sprocket 19 and the upper end of the gate. From the lower end of the gate the film passes partly over and between a pair of tension rolls 23 and 24 that are fully described as to structure and function in the aforesaid Patent No. 2,099,376 and also in patent to Shoup, No. 2,107,743, granted February 8, 1938; and between said tension rolls and the lower end of the gate a lower loop 25 is maintained in the film. From the roll 24 the film passes over the lower half of a drum 26 that forms an element of a sound reproducing mechanism that is also fully disclosed in the aforesaid Patent No. 2,099,376. From the sound reproducing mechanism the film passes over the lower feed sprocket 21, and thence to the receiving reel of the machine, or, in the case of an endless film, to the film holder.

Describing now the present improvement, attached to and projecting forwardly of the gear box 13 is a rectangular box-like frame structure 27, in and between the side walls of which are mounted a pair of fixed shafts 28 and 29. Journaled on a projecting end of shaft 28 is a roller 30 having a flange 30' on its outer end, and journaled on a similar projecting end of shaft 29 is a second flanged roller 31. The film traveling from the feed reel, or the film holder in the case of an endless film, travels successively over the rollers 31 and 30 on its way to the upper feed sprocket 19; and to create a substantially semi-circular upstanding loop in the film as it travels over roller 30, the film between the rollers 31 and 30 is depressed by an idler roller 32 journaled on the lower end of an arm 33 that is pivoted at 34 on the frame 27 and is normally urged upwardly by a light spring 35 so as to cause the roller 32 to hug the periphery of the roller 30, and thus create an upstanding loop in the portion of the film engaged with roller 30.

Mounted on the top of the frame 27 is a micro-switch comprising a box 36, in which is horizontally pivoted at 37 one end of a switch arm 38, the free end of which forms a knuckle joint with a short cooperating pivoted member 39 to produce a switch of the "snap" type. A contact 53 mounted on the under side of switch arm 38 cooperates with a fixed contact 52 in the switch box. The two contacts 53 and 52 are located in a relay circuit that controls the circuit of an electric motor M (Fig. 5) that operates the film feed sprockets 19 and 21. A spring 42 bearing on the switch arm 38 constantly urges the contact 53 into engagement with the contact 52, as shown in Fig. 4. The switch 53, 52 is normally maintained in the open position shown in Fig. 3, against the thrust of spring 42, by a lever 43 that is pivoted at 44 in a bracket 45 integral with a plate 36' attached to the top of the switch box 36, and on its free end carries a roller 46 that, as shown in Figs. 2 and 3, normally engages one edge of the film, being pressed into such engagement by the spring 42 acting through switch arm 38 and a plunger rod 47 slidably mounted in a guide 47' and bearing at one end on the switch arm 38 and at its other end on the lever 43.

It will be noted that the roller 46 which rides on one edge of the film is located laterally opposite the top of the film guide roller 30, so that the roller 46 engages the edge of the upstanding substantially semi-circular loop in the film that rides over the roller 30, and the roller flange 30' prevents the film being pushed edgewise by the roller. The film, when in such loop form, will resist the light push of the roller 46 without curling inwardly; whereas, if the roller engaged a straight or flat unsupported section of the film, the edge of the latter would be likely to yield and more or less curl inwardly. The edge of the film engaged with the roller 46 is formed with a shallow notch or depression 48, and this notch or depression is so located on the film that the roller 46 will drop into the same and allow the spring 42 to close the relay switch 53, 52 shortly after the final frame of a film record has crossed the light beam. The dropping of the roller 46 into the cut-out 48 causes the switch arm 38 under the thrust of the spring 42 to snap to the position shown in Fig. 4, closing the contacts 53 and 52, and this, through the operation of a relay circuit and magnet later described, brings about the opening of the main switch in the main film feeding circuit, thus causing the feed sprockets 19 and 21 to stop further feeding of the film until said main switch has again been closed.

It may here be mentioned that the roller 46 is not in the film notch 48 at the time the film has stopped moving, since the inertia of the film driving parts carries the film notch several frames beyond the roller. In cases where the improvement is applied to coin-controlled projectors, the micro-switch, when it closes, closes a relay circuit which in turn brings about the opening of a main switch in the main feeding circuit that includes the motor M and the lamp, thus stopping the projector and extinguishing the light beam. To effect a resumption of the projector operation, a coin dropped through the coin box mechanism effects the reclosing of said main switch; and the machine resumes operation.

In Fig. 5 I have illustrated one organization of circuits, magnets, motor and lamp that may be used in coin-controlled projectors, and, with slight modification, in projectors not coin-controlled. A and A' designate the feed lines from a source of current. B designates the main film-feeding circuit line, connected across the lines A, A', and including the motor M, lamp L (in parallel with motor M) and a main switch 50 comprising a fixed contact 64 and a movable contact 65 on one arm of a pivoted lever 61 that is urged in a direction to keep switch 50 open by a spring 63. A branch B' of circuit B includes a magnet 51 for closing switch 50. A relay circuit C, which includes the switch arm 38, and the contacts 53, 52 (which form the relay switch) is connected across circuit B at 37 and 54, and includes a relay magnet 62, the function of which is to retract a latch 60 that, when magnet 51 is energized, engages one end of lever 61 and holds switch 50 closed against the pull of spring 63. Between circuit B and its branch B' is a pivoted switch arm 55 electrically connected to circuit B and projecting into a coin chute 56 and held in such position by a light spring 57. Arm 55 carries a contact 58 adapted to be thrown into momentary engagement with a fixed contact 59 on branch circuit B' by a coin dropping through the chute. The diagram, Fig. 5, shows the parts in the positions they occupy when the notch 48 of the film has passed a short distance beyond the roller 46, the main switch 50 has been opened, stopping the feeding of the film, and the relay switch 53, 52 has been opened; this corresponding to the position of the parts shown in Fig. 3.

In operation, when roller 46 drops into notch 48, relay circuit C is energized by being closed at 53, 52, energizing unlatching magnet 62, and main switch 50 is opened by spring 63 and kept open after roller 46 has passed out of and beyond notch 48. This stops motor M, and extinguishes lamp L. To restart the projector in operation, a coin is dropped in chute 56. This momentarily connects circuit B to its branch B' at 58, 59, energizing magnet 51 and closing and latching main switch 50, and, since main circuit B has now been closed, motor M is energized and starts the machine in operation, and simultaneously lamp L is re-lighted.

Some films carry picture records of different values. For example, a film may carry a relatively short picture, for the display of which the charge is one nickel; and this may be followed by a longer picture in multi-color for the display of which a fair charge may be three pickels or fifteen cents. Or the film may carry one or more of the longer pictures alone. Fig. 6 illustrates a film equipped with three successive depressions or notches 48ª, 48ᵇ and 48ᶜ that precede the first frame of a fifteen cent picture. These notches are spaced sufficiently apart that the projector will come to rest when the roller 46 is between the notches 48ª and 48ᵇ, and again when the roller is between the notches 48ᵇ and 48ᶜ. Obviously, this will require the deposit of three nickels successively before the projector will begin the display of the long fifteen cent picture. By the use of two, four or more spaced film notches or depressions pictures of other values which are even multiples of a nickel (or other coin used) may be similarly displayed.

I am aware that a film having a depression in its edge, an arm carrying a roller riding on said edge, and means brought into action when the roller enters the depression to open the circuit of the film-driving motor is broadly old and known in patents to Sandell, No. 890,936, and to Streyckmans, No. 2,206,134; but my present invention presents cooperative improvements in all of these parts that together effect the result by simplified means and in a more certain and reliable manner.

In cases where the improvement is applied to projectors not coin-controlled, the coin chute 56 is, of course, omitted, and the projector is started in operation by manual manipulation of switch arm 55 to momentarily connect circuit B to its branch B' at contacts 58 and 59.

I claim:

1. In a device of the class described, the combination with film feeding and guiding means, of an electric motor for operating said feeding means, a normally open main switch in the circuit of said motor spring urged to open position, a magnet in the motor circuit for closing said main switch, a normally open starting switch in the motor circuit adapted, when closed, to energize said magnet and close said main switch, a latch for holding said main switch closed, a movable member carrying a roller adapted to ride on the edge of a film having a depression in said edge, a spring acting through said movable member to press said roller against said film edge, and means brought into action by said spring when said roller enters said depression to open said main switch, said last named means including a relay circuit, an unlatching magnet therein, and a normally open switch in said relay circuit that is closed by said spring when said roller enters said depression.

2. In a device of the class described, the combination with film feeding and guiding means, said guiding means including a film guide roll, of an electric motor for operating said feeding means, a normally open main switch in the circuit of said motor spring urged to open position, a magnet in the motor circuit for closing said main switch, a normally open starting switch in the motor circuit adapted, when closed, to energize said magnet and close said main switch, a latch for holding said main switch closed, a spring pressed roll acting on a film having a notch in one edge thereof to form in the film an upstanding loop on said guide roll, a movable member carrying a roller so located that it engages the notched edge of the film substantially at the top of said loop, a spring acting through said movable member to press said roller against said notched edge of the film, and means brought into action by said spring when said roller enters said notch to retract said latch and open said main switch.

3. An embodiment of claim 2 wherein the film guide roll has a flange on one end thereof forming an abutment for the edge of the film that is opposite the notched edge engaged by the roller.

THOMAS J. MORGAN.